United States Patent [19]
Clark et al.

[11] Patent Number: 6,076,095
[45] Date of Patent: *Jun. 13, 2000

[54] METHOD OF ONE SYSTEM OF A MULTISYSTEM ENVIRONMENT TAKING OVER LOG ENTRIES OWNED BY ANOTHER SYSTEM

[75] Inventors: Carl Edward Clark, Poughkeepsie; Steven Jay Greenspan, Hyde Park, both of N.Y.; Jeffrey Douglas Haggar, Holly Springs, N.C.; Danny Ray Sutherland, Poughkeepsie, N.Y.

[73] Assignee: International Business Machines Corporation, Armonk, N.Y.

[*] Notice: This patent is subject to a terminal disclaimer.

[21] Appl. No.: 08/827,205

[22] Filed: Mar. 28, 1997

[51] Int. Cl.[7] ................................................... G06F 17/30
[52] U.S. Cl. ........................... 707/202; 707/200; 707/8; 707/1
[58] Field of Search ............................... 707/200, 8, 202, 707/1

[56] References Cited

U.S. PATENT DOCUMENTS

| | | | |
|---|---|---|---|
| 4,878,167 | 10/1989 | Kapulka et al. | 714/16 |
| 5,155,678 | 10/1992 | Fukumoto et al. | 707/202 |
| 5,191,651 | 3/1993 | Halim et al. | 709/250 |
| 5,280,611 | 1/1994 | Mohan et al. | 707/8 |
| 5,317,731 | 5/1994 | Dias et al. | 707/8 |
| 5,327,556 | 7/1994 | Mohan et al. | 707/8 |
| 5,339,427 | 8/1994 | Elko et al. | 709/103 |
| 5,345,590 | 9/1994 | Ault et al. | 709/1 |
| 5,394,554 | 2/1995 | Elko et al. | 709/224 |
| 5,410,695 | 4/1995 | Frey et al. | 709/300 |
| 5,463,736 | 10/1995 | Elko et al. | 710/28 |
| 5,471,631 | 11/1995 | Beardsley et al. | 713/502 |
| 5,493,668 | 2/1996 | Elko et al. | 711/130 |
| 5,537,574 | 7/1996 | Elko et al. | 711/141 |
| 5,574,902 | 11/1996 | Josten et al. | 707/1 |
| 5,737,600 | 4/1998 | Geiner et al. | 707/200 |
| 5,832,515 | 11/1998 | Ledain et al. | 707/202 |
| 5,920,875 | 7/1999 | Clark et al. | 707/206 |
| 5,956,735 | 9/1999 | Clark et al. | 707/206 |
| 5,966,708 | 10/1999 | Clark et al. | 707/101 |
| 5,999,935 | 12/1999 | Clark et al. | 707/101 |

OTHER PUBLICATIONS

Copending application 08/827,293, Mar. 1997.
"LRAID: Use of Log Disks for an Efficient RAID Design," IBM Technical Disclosure Bulletin, vol. 37, No. 02A, pp. 19–20 (Feb. 1994).

*Primary Examiner*—Anton W. Fetting
*Assistant Examiner*—Greta L. Robinson
*Attorney, Agent, or Firm*—Lawrence D. Cutter, Esq.; Heslin & Rothenberg, P.C.

[57] ABSTRACT

One system of a multisystem environment takes over log entries owned by another system of the environment. When a system owning entries on a primary log stream is inactive (or a sync point manager on the system is inactive), another system of the multisystem environment writes the log entries corresponding to the inactive system to other locations. The entries within the other locations are not owned by any system. Thus, the resource managers associated with those log entries are eligible for restarting on any system of the multisystem environment. However, all resource managers involved in a common set of transactions are to restart on the same system. The other resource managers can restart on another system. When one of the resource managers restarts on a system, the system takes back ownership of the entries associated with the common set of transactions.

40 Claims, 5 Drawing Sheets

METHOD OF ONE SYSTEM OF A MULTISYSTEM ENVIRONMENT TAKING OVER LOG ENTRIES OWNED BY ANOTHER SYSTEM

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Tail Compression Of A Sparse Log Stream Of A Computer System," by Clark et al., Ser. No. 08/827,290, now U.S. Pat. No. 5,920,875, "Tail Compression Of A Log Stream Using A Scratch Pad Of Logically Deleted Entries," by Clark et al., Ser. No. 08/827,560, now U.S. Pat. No. 5,966,708;

"System Of Compressing A Log Stream Using A Scratch Pad Of Logically Deleted Entries," by Clark et al., Ser. No. 08/828,465;

"One System Of A Multisystem Environment Taking Over Log Entries Owned By Another System," by Clark et al., Ser. No. 08/827,293;

"Tail Compression Of A Sparse Log Stream Of A Multisystem Environment," by Clark et al., Ser. No. 08/827,214 now U.S. Pat. No. 5,999,935;

"System Of Compressing The Tail Of a Sparse Log Stream Of A Multisystem Environment," by Clark et al., Ser. No. 08/827,559; and "System Of Compressing The Tail Of A Sparse Log Stream Of A Computer System," by Clark et al., Ser. No. 08/827,558, now U.S. Pat. No. 5,956,735.

TECHNICAL FIELD

This invention relates, in general, to the management of a log stream and, in particular, to one system of a multisystem environment taking over entries of the log stream, which are owned by another system of the multisystem environment.

BACKGROUND ART

Typically, a log stream includes historical log data to be used in, for instance, problem determination, recovery and/or maintenance of a computer system. In particular, the log data contains the state of various transactions that are executing or have executed on the computer system.

If the computer system or a component of the computer system fails, the log data is used in completing any incomplete transactions.

Generally, if a system or a component of the system fails resulting in incomplete transactions, the transactions cannot be completed until the failed system (or component) is reinitialized. One exception to this is when another system is dedicated as a back-up to the failed system. In that case, the incomplete transactions can be completed on the back-up system, once the back-up system performs certain tasks to get ready for the processing of the incomplete transactions.

One example of a dedicated back-up system is described in U.S. Pat. No. 5,155,678, entitled "Data Availability in Prestartable Data Base System," issued Oct. 13, 1992 and assigned to the same assignee as the present invention. As described therein, the back-up system processes the log records written by the failed system and when the processing is complete, the log is closed. Thus, the log is a single system log, written to by only one system.

The use of a dedicated back-up system has obvious disadvantages, including the cost associated with maintaining two systems, one of which is of limited use. Thus, a need exists for a mechanism that allows one system to complete transactions for another system, without requiring the system to be dedicated as a back-up system.

Additionally, a need exists for a mechanism that allows one system in a multisystem environment to take over log entries of another system in the multisystem environment, wherein the log entries are part of a multisystem log stream. A further need exists for a log management capability in which the restarting of a failing system (or a failing component) is independent of the restarting of transactions that had been active on the failing system. A yet further need exists for a mechanism that can recover from a failure during the process of recovering from another failure.

SUMMARY OF THE INVENTION

The shortcomings of the prior art are overcome and additional advantages are provided through the provision of a method of managing a log stream of a multisystem environment, which includes a plurality of systems. A first system of the plurality of systems writes one or more entries to a first multisystem log stream. The first system owns those entries. The first multisystem log stream is adapted to receive at least one additional entry from one or more other systems of the plurality of systems. A second system of the plurality of systems rewrites at least one entry of the one or more entries written on the first multisystem log stream to at least one other location. The rewriting removes ownership of the at least one entry.

In one example, the at least one other location is on a second multisystem log stream. In another example, however, the at least one other location is at or near a head of the first multisystem log stream.

In one example, the second system is an active system not dedicated to back-up of the first system.

In yet a further embodiment of the invention, a resource manager is started on any one system of the plurality of systems. The resource manager is included in a group of one or more resource managers associated with an entry set of the at least one entry. The entry set is written back to the first multisystem log stream, such that the one system owns the entry set.

In a further example of the invention, an indication is made that any other resource managers of the group are to restart on the same system as the one resource manager.

In another embodiment of the present invention, a method of managing a log stream of a multisystem environment including a plurality of systems is provided. The method includes rewriting one or more entries of a first multisystem log stream to one or more other locations. The one or more entries are owned by an inactive first system of the plurality of systems, and the rewriting is performed by a second system of the plurality of systems. Thereafter, an indication is made that the first system does not own the one or more entries, and a further indication is made that one or more resource managers of the first system is allowed to restart on any of the plurality of systems.

In yet a further embodiment of the invention, a method of managing a log stream of a multisystem environment including a plurality of systems is provided. One or more entries of a first log stream to be written to a second log stream is identified. The one or more entries is owned by a first system of the plurality of systems. A second system of the plurality of systems rewrites the one or more entries to one or more other locations. The second system is an active system not dedicated to back-up of the first system.

In yet a further aspect of the present invention, an article of manufacture including a computer useable medium having computer readable program code means embodied therein for causing the managing of a log stream of a multisystem environment is provided. The computer readable program code means in the article of manufacture includes computer readable program code means for causing a computer to effect writing, by a first system of the plurality of systems, one or more entries to a first multisystem log stream. The one or more entries are owned by the first system. The first multisystem log stream is adapted to receive at least one additional entry from one or more other systems of the plurality of systems. The article of manufacture further includes computer readable program code means for rewriting, by a second system of the plurality of systems, at least one entry of the one or more entries to at least one other location.

In another aspect of the present invention, an article of manufacture including a computer useable medium having computer readable program code means embodied therein for causing the managing of a log stream of a multisystem environment is provided. The computer readable program code means in the article of manufacture includes computer readable program code means for causing a computer to effect rewriting one or more entries of a first multisystem log stream to one or more other locations. The one or more entries are owned by an inactive first system of a plurality of systems and the rewriting is performed by a second system of the plurality of systems. Additionally, computer readable program code means is provided for causing a computer to effect indicating that the first system does not own the one or more entries and for indicating that one or more resource managers of the first system is allowed to restart on any of the plurality of systems.

In yet a further embodiment of the invention, an article of manufacture including a computer useable medium having computer readable program code means embodied therein for causing the managing of a log stream of a multisystem environment is provided. The computer readable program code means in the article of manufacture includes computer readable program code means for causing a computer to effect identifying one or more entries of a first log stream to be rewritten to one or more locations. The one or more entries is owned by the first system of a plurality of systems. Additionally, computer readable program code means is provided for causing the computer to effect rewriting, by a second system of the plurality of systems, one or more entries to the one or more other locations. The second system is an active system not dedicated to backup of the first system.

The log management capability of the present invention advantageously enables one system of a multisystem environment to take over log management of entries owned by another system of the multisystem environment. The log management capability does not require a dedicated back-up system. Further, the log management mechanism of the present invention is applicable to multisystem log streams, which are adapted to be written to by a plurality of systems. The mechanism of the present invention also allows resource managers that are involved in transactions represented by the log stream entries to restart on another system in the multisystem environment to finish processing their incomplete transactions. The system on which the resource managers restart may be different than the system which originally generated the log stream entries and/or different than the system which originally took over management of the log stream entries.

The technique of the present invention provides for independence of the restarting failing system and the restarting of resource managers that had been active on the failing system. It further allows a dynamic determination of the restart dependencies of resource managers to guarantee that the group of dependent resource managers restart on the same system and to allow those resource managers that are not within that group to restart on a different system. Further, the present invention provides the ability to recover from failures during the process of recovering from other failures.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, one system of a multisystem environment takes over log entries owned by another system of the multisystem environment. In one example, this occurs subsequent to the termination of the system (or a component of the system) that owned the log entries. The log takeover enables resource managers that are involved in transactions represented by those log stream entries to restart on any system of the multisystem environment to finish processing their transactions. When a resource manager restarts on a given system, ownership of its log entries is taken back, as described in detail below.

Figure 1:
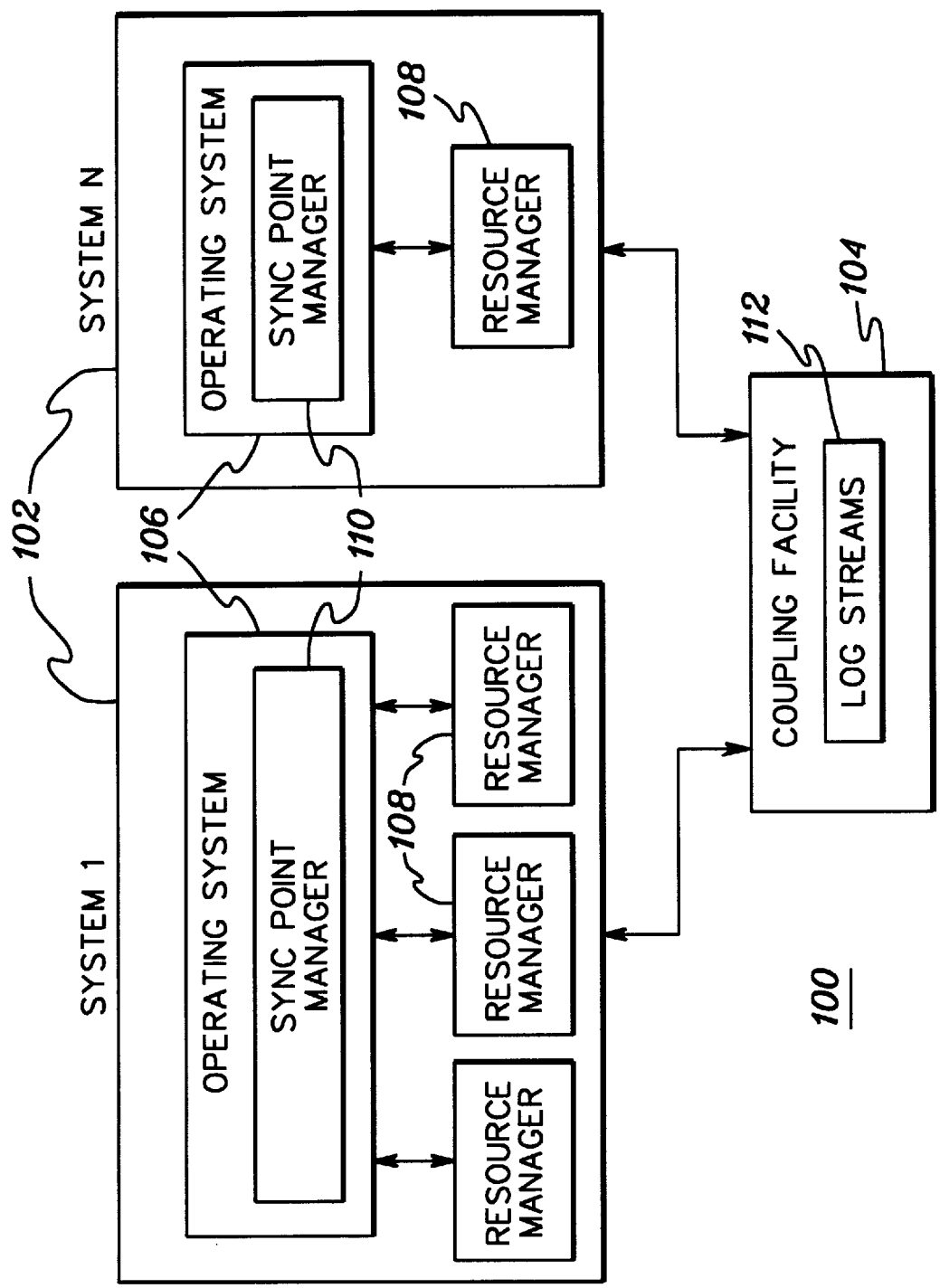
FIG. 1 depicts one example of a multisystem environment incorporating and using the log stream management capability of the present invention.

One example of a multisystem environment incorporating and using the log stream management capability of the present invention is depicted in FIG. 1 and described in detail herein. In one example, multisystem environment 100 is based on the Enterprise Systems Architecture (ESA)/390 offered by International Business Machines Corporation, and includes one or more systems 102 coupled to a coupling facility 104. Each system 102 includes an operating system 106 and one or more resource managers 108, each of which is described below.

In one embodiment, operating system 106 is, for instance, the Multiple Virtual Storage (MVS) operating system offered by International Business Machines Corporation (or the OS/390 operating system offered by International Business Machines Corporation). In one example, operating system 106 includes a sync point manager 110, which coordinates participants (such as resource managers) in a 2-phase commit protocol. One example of a sync point manager is a Resource Recovery Service, which may be offered by International Business Machines Corporation.

The sync point manager is coupled to one or more resource managers 108. Each of resource managers 108 owns and controls a set of resources within the system. As one example, a resource manager is a database management facility, such as IMS or DB2, each of which is offered by International Business Machines Corporation.

As mentioned above, each system is coupled to coupling facility 104. Coupling facility 104 is a shareable facility that contains storage accessible by the systems and performs operations requested by the resource managers and/or programs running within the systems. In one embodiment, coupling facility 104 is a structured-external storage processor (SES). Examples of a coupling facility are described in detail in U.S. Pat. No. 5,317,739, entitled "Method and Apparatus for Coupling Data Processing Systems," by Elko et al., issued May 31, 1994, and in U.S. patent application Ser. No. 08/632,683 now U.S. Pat. No. 5,737,600 entitled, "Method And System For Log Management In A Coupled Data Processing System," by Geiner et al., filed on Apr. 15, 1996, both assigned to International Business Machines Corporation, and each of which is hereby incorporated herein by reference in its entirety.

In accordance with the principles of the present invention, coupling facility 104 includes a plurality of log streams 112, which are accessible by one or more of the plurality of systems of the multisystem environment. In particular, one or more of the sync point managers uses the log streams during the log management capability of the present invention, as described in detail below.

In one embodiment, at least a portion of one or more of the log streams can be stored in one or more storage devices (e.g., direct access storage devices (DASD)), when, for example, sufficient space for the log stream(s) no longer exists within the coupling facility.

One example of a log stream and various services corresponding to the log stream are described in detail in U.S. patent application Ser. No. 08/632,683 now U.S. Pat. No. 5,737,600 entitled, "Method And System For Log Management In A Coupled Data Processing System," by Geiner et al., filed on Apr. 15, 1996, which is hereby incorporated herein by reference in its entirety.

Figure 2:
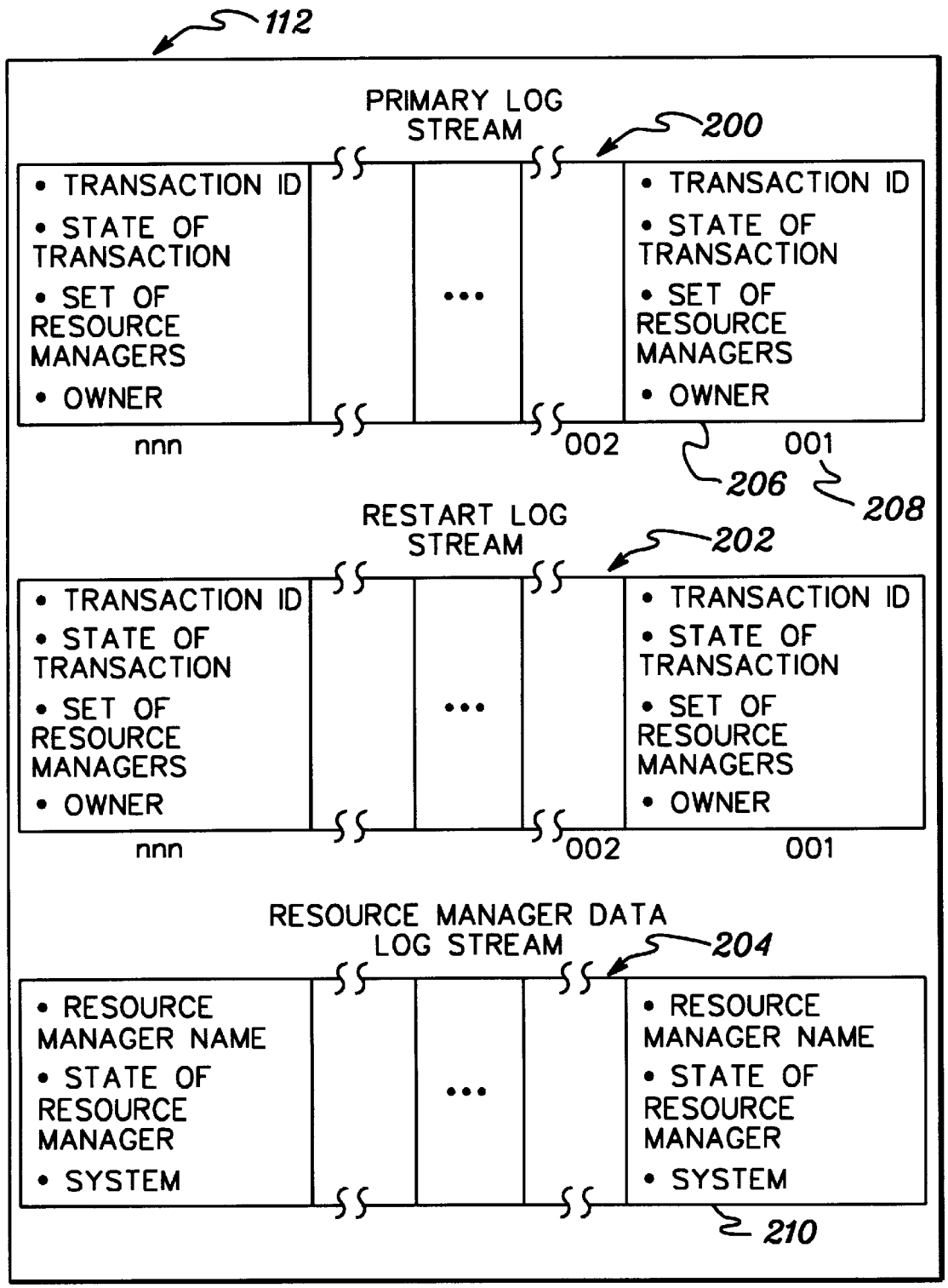
FIG. 2 depicts examples of a primary log stream, a restart log stream and a resource manager data log stream, respectively, of the multisystem environment of FIG. 1, used in accordance with the principles of the present invention.

One example of the components of log streams 112, used for the present invention, are described in detail with reference to FIG. 2. In one embodiment, log streams 112 include three log streams: a primary log stream 200, a restart log stream 202, and a resource manager data log stream 204, each of which is described in detail below.

In one example, primary log stream 200 includes information about the transactions processing on the systems, as well as the resource managers involved in those transactions. The information is written to the primary log stream under direction of, for instance, the sync point managers. In one embodiment, primary log stream 200 includes a number of log blocks or log entries 206, each including various data, such as a transaction identifier, the state of the transaction (e.g., committed, back-out) and the name of the system that owns the entry (i.e., the system that wrote the data to the primary log stream). Each log entry has a block id 208, which represents, for instance, a relative offset into the log stream. In one example, the smaller the block id, the older the data.

Restart log stream 202 represents, for instance, the transactions that are eligible to be completed on another system. In one example, entries of restart log stream 202 have a similar format as the entries of primary log stream 200. In particular, they also include the transaction identifier, and the state of the transaction; however, the name of the system that owns the entry is set to null. The log entries on the restart log stream are not owned by any system.

Resource manager data log stream 204 keeps track of all the resource managers that are using the sync point managers for coordination. In one example, it includes a plurality of entries 210 and each entry includes the state of a resource manager involved with a sync point manager and the system on which the resource manager is to run.

In the embodiment described herein, the three multisystem log streams are used by one or more of the sync point managers to take over log entries associated with failed (or inactive) sync point managers and/or failed (or inactive) systems. This is only one example, however. Other components of the system can also have log streams associated therewith that can be managed by the present invention without departing from the spirit of the present invention.

Each of the log streams described above may have additional data, which need not be described for the present invention. Further, in another embodiment of the invention, the log streams are not included in a coupling facility, but are instead stored in shared storage, such as, for instance, shared external storage devices (e.g., DASD).

The three types of log streams described above are used in a log takeover function of the present invention. In one embodiment, the log takeover function is performed during initialization of a sync point manager. That is, during initialization of a particular sync point manager, that sync point manager detects that other systems, which own log entries on the primary log stream, are not active or that the sync point managers are not currently active on those systems. Thus, the sync point manager making this detection, performs log takeover for those system. Additionally, when the sync point manager initializes on, for example, System X, the sync point manager of System X performs log takeover for any log entry still owned by System X.

One embodiment of the log takeover function is described below with reference to FIG. 3. In the one example described below, System X is taking over entries owned by System Y. Thus, after completion of the log takeover, any transactions represented by the log entries of System Y, will be eligible for completion by a sync point manager on another system, even though the sync point manager may now be active again on System Y.

Figure 3:
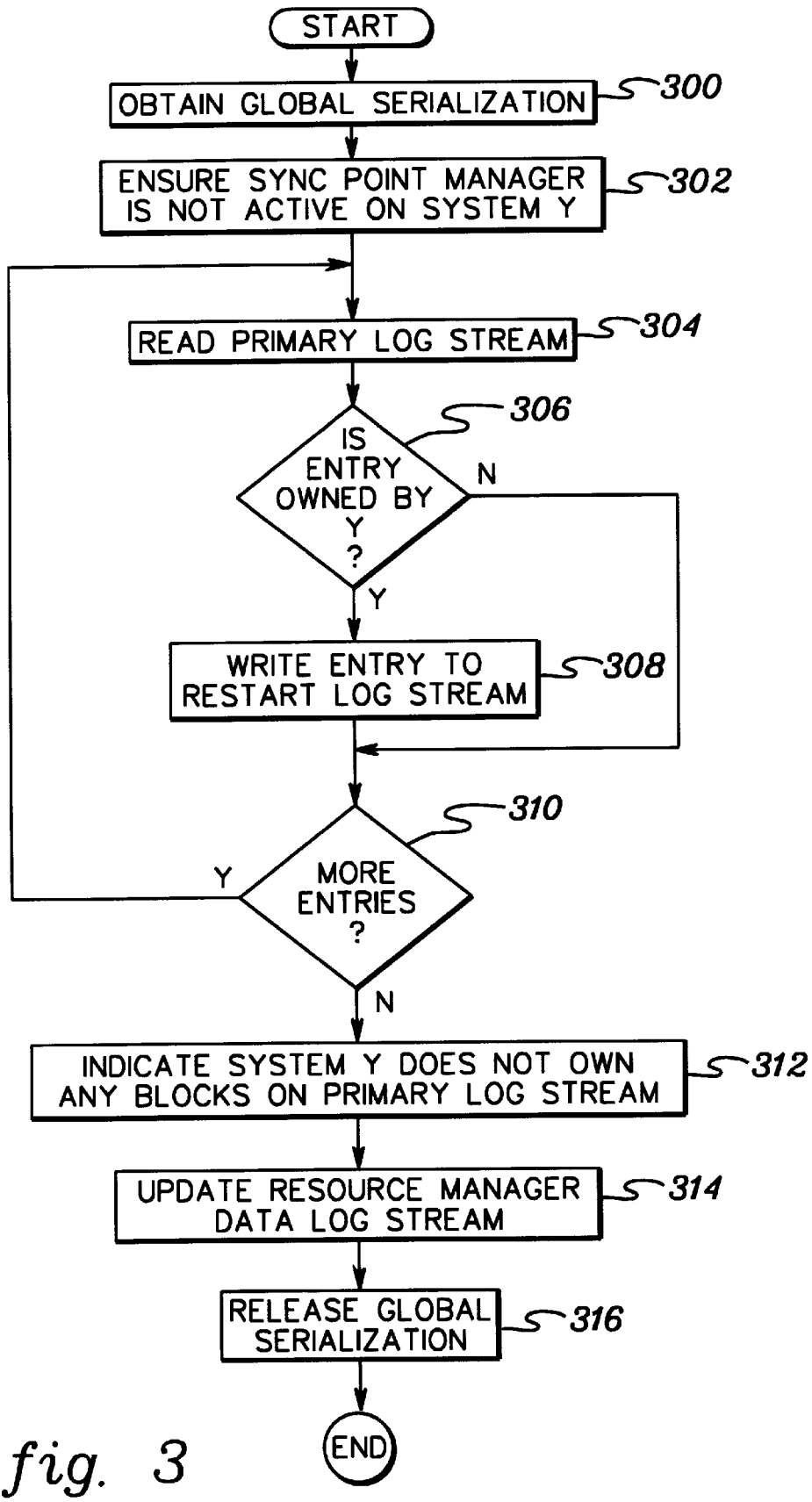
FIG. 3 depicts one example of the logic used by one system of the multisystem environment of FIG. 1 to take over log entries owned by another system, in accordance with the principles of the present invention.

Referring to FIG. 3, initially, the sync point manager on System X (referred to herein as Sync Point Manager X) that is to perform the log takeover function obtains global serialization (i.e., an environment-wide enqueue), such that any system cannot perform log takeover or log takeback, STEP 300.

After serialization is obtained, Sync Point Manager X ensures that the sync point manager of System Y is not active on System Y, STEP 302. In particular, in one embodiment, there is a set of enqueues, one for each active sync point manager of the multisystem environment. Part of each enqueue is the system name for that sync point manager. Thus, in order to determine if the sync point manager of System Y is active, Sync Point Manager X checks the status of the enqueue pertaining to System Y. If the status indicates that Sync Point Manager Y is active, then takeover does not proceed. However, if the status indicates the sync point manager is inactive, then takeover proceeds, as follows.

Subsequently, an entry on the primary log stream is read, STEP 304, and if that entry is owned by System Y, INQUIRY 306, the entry is written to restart log stream 202, STEP 308. In particular, in one example, the entry is written to the restart log stream, however, it physically remains on the primary log stream until the primary log stream is, for instance, compressed. (An example of a compression technique is described in detail in U.S. patent application Ser. No. 08/827,214, entitled "Tail Compression of A Sparse Log Stream of A Multisystem Environment," by Clark et al., (Docket No. P09-97-018), filed on the same day as this application and assigned to the same assignee as this application, which is hereby incorporated herein by reference in its entirety).

Although the entry is not physically removed from the primary log stream, it is logically deleted, as described below. By writing the entry to the restart log stream, the transaction represented by this log entry is allowed to be completed by a sync point manager on another system.

Subsequent to writing the entry on the restart log stream, or if the entry is not owned by System Y, a determination is made as to whether there are more entries on the primary log stream, INQUIRY 310. If there are more entries on the log stream, then control flows back to STEP 304, "READ PRIMARY LOG STREAM." However, if there are no more entries on the primary log stream, then processing continues, as follows.

Figure 5:
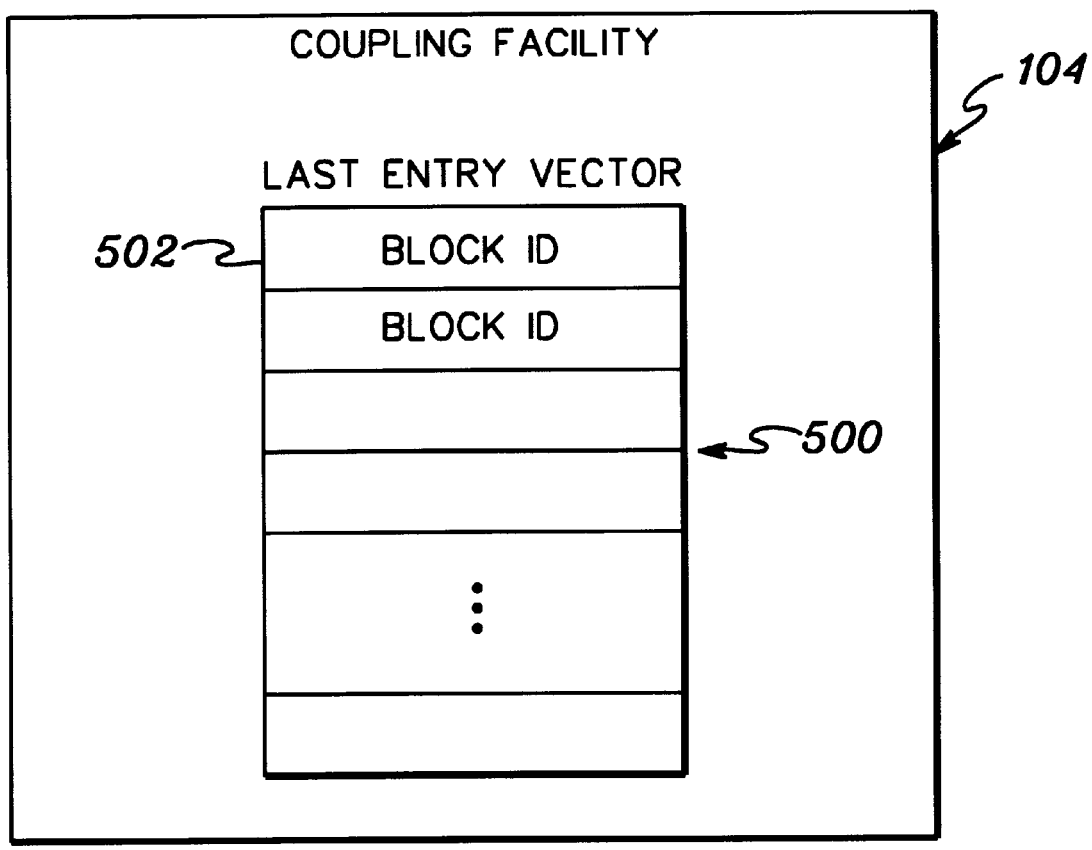
FIG. 5 depicts one example of a last entry vector updated during the log takeover procedure of FIG. 3, in accordance with the principles of the present invention.

Subsequent to writing all the entries owned by System Y onto the restart log stream, an indication is made that System Y does not own any of the blocks (i.e., log entries) on the primary log stream, STEP 312. In one example, this indication is made by updating a vector, referred to as a last entry vector. One embodiment of a last entry vector 500 is described in detail with reference to FIG. 5.

In one example, last entry vector 500 includes an entry 502 for each system that could potentially participate in writing entries to the primary log stream. For instance, if the multisystem includes two systems, System X and System Y, that could write to the primary log stream, then there would be two entries in the vector. Each entry includes, for instance, the block id of the oldest log entry in the primary log stream needed by the respective system.

In one embodiment, the last entry vector is created within coupling facility 104 using, for example, a set of services provided by a system logger component of the MVS operating system. (One embodiment of system logger is described in detail in MVS Programming Assembler Services Reference, IBM Publication No. GC28-1910-01 (September 1996); and MVS Programming Assembler Services Guide, IBM Publication No. GC28-1762-01 (September 1996), each of which is hereby incorporated herein by reference in its entirety.) In other embodiments, the last entry vector is maintained on a shared external storage device (e.g., DASD) or copies of the vector are maintained in main storage, a cache, or auxiliary storage of each system. Other examples are also possible and included within the spirit of the present invention.

In order to indicate that System Y, as one example, does not own any blocks on the primary log stream, the entry in vector 500 corresponding to System Y is set to a value that represents the highest possible valid block id. This logically deletes all the log entries in the primary log stream corresponding to System Y. The logical deletion allows the sync point manager on any system to free those blocks during, for example, a tail compression.

Referring back to FIG. 3, subsequent to indicating that System Y does not own any blocks on the primary log stream, the resource manager data log stream is updated, STEP 314. In particular, each entry in the resource manager data log stream is read and for each resource manager that was required to restart on System Y, its log entry is updated to reflect that it can start on any system.

Subsequently, global serialization is released, STEP 316, and processing of the log takeover function is complete.

As described above, when a sync point manager initializes, it performs any required log takeover, including any takeover necessary for its own entries. When a system is taking over its own entries, however STEP 302, described above, is not applicable. Further, in one example, in order for a system to determine whether it needs to take over its own entries, it checks the last entry vector. If the block id located therein for that system is the highest possible block id, then the system does not own any entries on the primary log stream (another system may have already taken the entries over), so there is nothing to take over.

In another aspect of the present invention, the entries on the restart log stream need to be taken back in order to complete the transactions associated with those entries. In one example, the log takeback procedure is performed, when a resource manager, having incomplete transactions as represented by entries on the restart log stream, is restarted on a system. The log takeback procedure includes copying entries from the restart log stream back to the primary log stream, as described below.

One example of a log takeback procedure is described in detail with reference to FIG. 4. In the one example described herein, System X (i.e., the sync point manager of System X) performs the log takeback procedure. The log takeback procedure is serialized by the same global serialization as the log takeover procedure.

Figure 4:
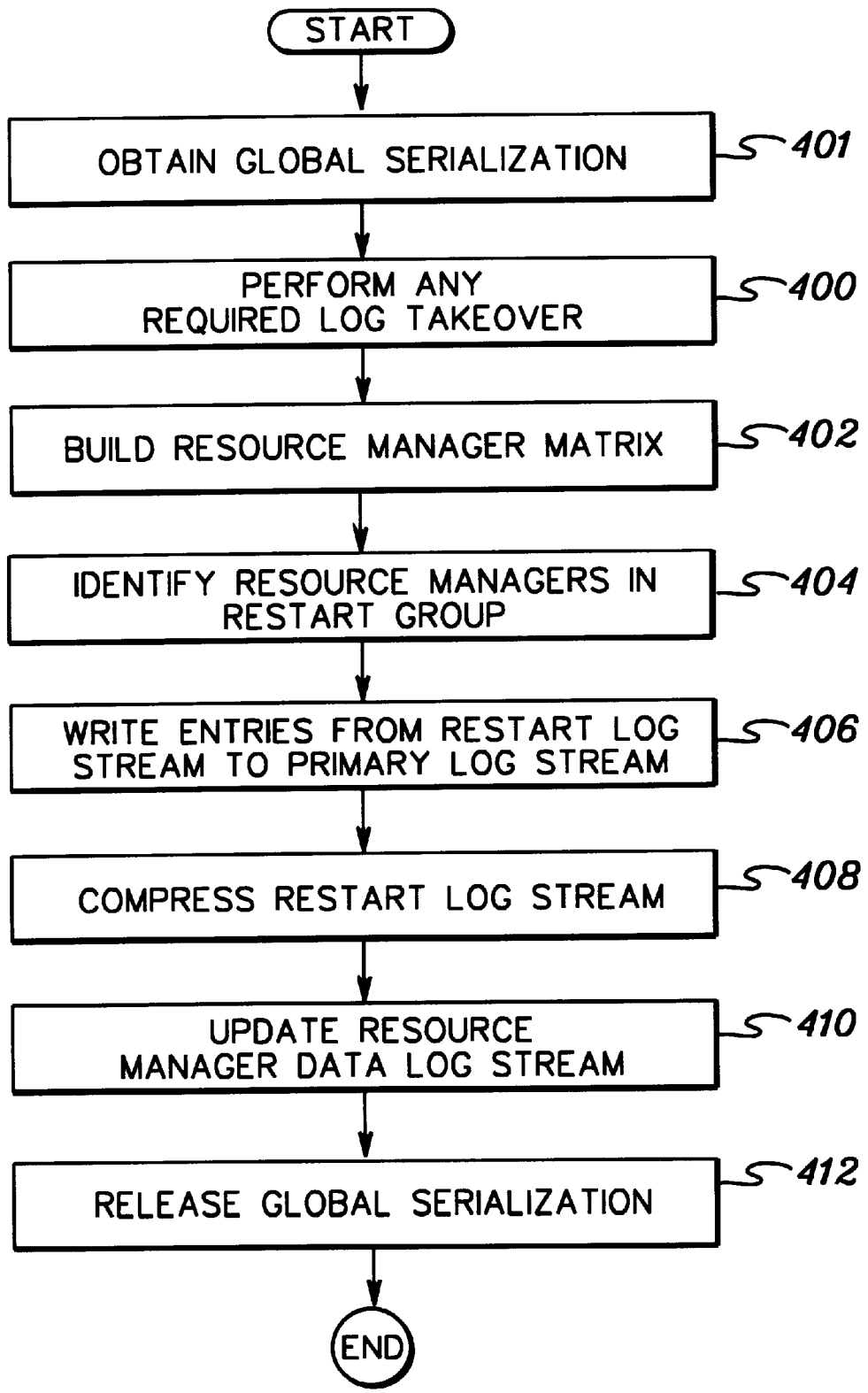
FIG. 4 depicts an embodiment of the logic used to take back log entries located on the restart log stream of FIG. 2, in accordance with the principles of the present invention.

Referring to FIG. 4, when a resource manager restarts on a system, such as System X, part of the restart process is to perform any required log takeover actions, STEP 400. For example, STEPS 302–314 of FIG. 3 are performed by Sync Point Manager X, as described in detail above.

In accordance with the principles of the present invention, the sync point manager requires that all resource managers which are involved in a common set of transactions, are to restart with the sync point manager on a common system. Thus, the first resource manager of a group of one or more resource managers involved in a common set of transactions (herein referred to as the restart group) can restart on any system, but the remaining resource managers of the group are to restart on the same system as the first resource manager. Thus, during the log takeback procedure, a determination of the members of the restart group is made.

For example, a two-dimensional matrix of resource managers (RM) involved in the transactions represented by the log stream entries of the restart log stream is built, STEP 402. In particular, the entries of the restart log stream are read in order to build the two-dimensional matrix.

As one illustration of building the matrix, assume the following situation:

RM1 and RM2 are involved in Transaction A,
RM2 and RM3 are involved in Transaction B,
RM3 and RM4 are involved in Transaction C, and
RM5 and RM6 are involved in Transaction D.

From the above fact pattern, the following two-dimensional matrix is created:

|     | RM1 | RM2 | RM3 | RM4 | RM5 | RM6 |
| --- | --- | --- | --- | --- | --- | --- |
| RM1 |     | *   |     |     |     |     |
| RM2 | *   |     | *   |     |     |     |
| RM3 |     | *   |     | *   |     |     |
| RM4 |     |     | *   |     |     |     |
| RM5 |     |     |     |     |     | *   |
| RM6 |     |     |     |     | *   |     |

Subsequent to building the two-dimensional matrix, the resource managers of a particular restart group are identified, STEP 404. In one example, this identification occurs by repeatedly ORing together the matrix row for the restarting resource manager with the matrix rows for all other resource managers identified in this matrix row. The resulting matrix row identifies the set of resource managers in the restart group.

For example, using the above matrix, an OR operation is performed between the matrix row for RM1 and the matrix row for RM2, since RM2 is identified in the row for RM1. Similarly, another OR operation is performed between the new row for RM1, which now includes RM1, RM2 and RM3, and the row for RM3, since RM3 is included in the new row. This continues until no new resource managers are included in the row for RM1. The result of the repeated ORing is a resource manager restart group, including RM1, RM2, RM3 and RM4, which is depicted as follows:

|     | RM1 | RM2 | RM3 | RM4 | RM5 | RM6 |
| --- | --- | --- | --- | --- | --- | --- |
| RM1 | *   | *   | *   | *   |     |     |

Based on the foregoing, it can be seen that RM1, RM2, RM3 and RM4 are included in one restart group, while resource managers 5 and 6 form a different resource group. In accordance with the principles of the present invention, resource managers 1, 2, 3 and 4 would need to be restarted on the same system, while resource managers 5 and 6 can be started on a different system.

Subsequent to determining the members(s) of the restart group, all the log stream entries on the restart log stream for each resource manager in the restart group are written onto the primary log stream and these entries are marked as owned by System X, STEP 406. In one embodiment, the entries physically remain on the restart log stream until such time as when the restart log stream is compressed.

After writing the entries to the primary log stream, the restart log stream is compressed, STEP 408. (One example of a compression technique is described in detail in U.S. patent application Ser. No. 08/827,292 now U.S. Pat. No. 5,920,875, entitled "Tail Compression of A Sparse Log Stream of A Computer System," by Clark et al., (Docket No. P09-97-019), filed on the same day as this application and assigned to the same assignee as this application, which is hereby incorporated herein by reference in its entirety). In one example, the restart log stream is compressed by deleting the log tail. In particular, each log entry which needs to be retained and is older than the tail delete point is rewritten to another location within the log stream, such as, for instance, the head of the log stream, and all remaining entries at the tail are deleted. For example, assume the following entries are on the restart log stream, and each entry with an X placed underneath it can be deleted from the log stream:

| 10 | 9 | 8 | 7 | 6 | 5 | 4 | 3 | 2 | 1. |
| --- | --- | --- | --- | --- | --- | --- | --- | --- | --- |
|    |   |   |   | X | X | X |   | X |    |

It can be seen that most entries older than log entry 7 can be deleted, with the exception of entries 1 and 3. Therefore, entries 1 and 3 are rewritten to the other end of the log stream and renumbered as entries 11 and 12. Once this is accomplished, entries 1–6 are deleted from the restart log stream.

Subsequent to compressing the log stream, the resource manager data log stream is updated for all resource managers in this restart group, to indicate that these resource managers are required to restart on System X, STEP 410. Thereafter, global serialization is released, STEP 412.

In the one embodiment described above, the log entries that are taken over are written to another log stream (e.g., the restart log stream). This is only one example, however. The entries that are taken over can also be written to other locations on the same log stream. In one example, the entries are written to or near the head of the same log stream.

Thus, the entries that are taken over can be written to one or more other locations. This includes the same log stream, a different log stream or any other locations. These other embodiments are considered within the scope and spirit of the present invention.

In one embodiment of the invention, entries are written to or deleted from the log stream by the system logger component of the operating system, under instruction of the sync point managers. This is only one example, however. Other entities or components can also write to or delete from the log stream without departing from the spirit of the present invention.

The log management capability of the present invention, including the log takeover and log takeback procedures, provides a mechanism for one system in a multisystem environment to take over management of log stream entries generated by another system in the environment. This ability enables, for example, another system in the multisystem environment to perform tail compression of the primary log stream. It further allows the resource managers who are dependent on these log stream entries to restart with a sync point manager on another system in the environment to finish processing their incomplete transactions. The system on which the resource managers restart may be different than the system which originally generated the log stream entries and/or different than the system which originally took over management of the log stream entries.

The capability of the present invention advantageously includes independence of restarting failing systems and the restarting of resource managers that had been active on the failing system. Serialization is provided to allow these events to occur independently and concurrently. For example, the failed resource managers may restart on another system, either before or after or generally in parallel, with the restart of a failed system.

Further, advantages include dynamic determination of the restart dependencies of resource managers to guarantee that the group of dependent resource managers restart on the same system and to allow those resource managers that are not within that group to restart on a different system.

Yet further, the technique provides the ability to recover from sync point manager/system failures during the process of recovering from other sync point manager/system failures. For example, if System A fails and System B is performing log takeover for System A, and then System B fails, System C can takeover for System B (and thus, for System A).

The computer system described above is only one example. The present invention can be used and/or incorporated within other systems or environments without departing from the spirit of the present invention. For example, different architectures and/or operating systems can be used without departing from the spirit of the present invention. As a further example, each processor can include one or more operating systems. As another example, one or more central processing complexes are coupled to the coupling facility, and each central processing complex includes one or more central processing units, which executes an operating system. Further, in another embodiment, the computer system can include multiple coupling facilities. Additionally, the present invention is applicable to computer systems that do not include a coupling facility. Again, the computer system described herein is only one example.

As described above, a log stream includes one or more datum (e.g., log data). Thus, other entities that include one or more datum are included within the definition of a log stream. These entities include, but are not limited to, log files and log data sets.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing a log stream of a multisystem environment comprising a plurality of systems, said method comprising:
  writing, by a first system of said plurality of systems, one or more entries to a first multisystem log stream, said one or more entries being owned by said first system, said first multisystem log stream adapted to receive at least one additional entry from one or more other systems of said plurality of systems; and
  rewriting, by a second system of said plurality of systems, at least one entry of said one or more entries owned by said first system to at least one other location, said rewriting removing ownership of said at least one entry by said first system.

2. The method of claim 1, wherein said one or more other systems comprises at least said second system.

3. The method of claim 1, wherein said one or more other systems is in addition to said second system.

4. The method of claim 1, wherein said second system is an active system not dedicated as a back-up system to said first system.

5. The method of claim 1, wherein said at least one other location is located at one or more of the following:
  a second multisystem log stream; and
  at a head of said first multisystem log stream.

6. The method of claim 1, wherein said rewriting occurs subsequent to a termination of at least one component of said first system.

7. The method of claim 6, wherein said first system comprises one or more resource managers, and said method further comprises indicating that said one or more resource managers is allowed to restart on any one of said plurality of systems.

8. The method of claim 7, wherein said indicating comprises updating another log stream.

9. The method of claim 7, further comprising restarting one of said one or more resource managers on any one system of said multisystem environment, said restarting being independent of any restarting of said first system.

10. The method of claim 1, further comprising:
  starting a resource manager on any one system of said plurality of systems, said resource manager being included in a group of one or more resource managers associated with an entry set of said at least one entry rewritten to said at least one other location; and
  writing said entry set back to said first multisystem log stream, wherein said one system owns said entry set.

11. The method of claim 10, wherein said at least one other location is on a second multisystem log stream, and said method further comprises compressing said second multisystem log stream, subsequent to writing said entry set back to said first multisystem log stream.

12. The method of claim 11, further comprising updating a third multisystem log stream to indicate that any other resource managers of said group are to restart on the same system as said one resource manager.

13. The method of claim 10, wherein said entry set comprises any number of the entries of said at least one entry.

14. The method of claim 10, further comprising determining the one or more resource managers to be included in said group.

15. The method of claim 14, wherein said determining comprises:
  building a matrix of any resource managers associated with said at least one entry; and
  performing one or more OR operations between a row of said matrix for said starting resource manager and one or more other rows of said matrix, to obtain said group of one or more resource managers.

16. A method of managing a log stream of a multisystem environment comprising a plurality of systems, said method comprising:
  rewriting one or more entries of a first multisystem log stream to one or more other locations, said one or more entries owned by an inactive first system of said plurality of systems, and said rewriting being performed by a second system of said plurality of systems;
  indicating that said first system does not own said one or more entries; and
  indicating that one or more resource managers of said first system is allowed to restart on any of said plurality of systems.

17. The method of claim 16, further comprising taking back ownership of at least one entry of said one or more entries.

18. The method of claim 17, wherein said taking back comprises:
   restarting one resource manager of said one or more resource managers on one system of said plurality of systems, said one resource manager being associated with said at least one entry;
   determining if any other of said one or more resource managers are associated with said at least one entry, wherein a restart group of one or more resource managers associated with said at least one entry is determined;
   writing said at least one entry of said one or more other locations to said first multisystem log stream; and
   indicating that any resource managers of the restart group are to restart on the same system as the restarting resource manager.

19. The method of claim 18, wherein said one or more other locations is on a second multisystem log stream, and said method further comprises compressing said second multisystem log stream, subsequent to said writing of said at least one entry to said first multisystem log stream.

20. A method of managing a log stream of a multisystem environment comprising a plurality of systems, said method comprising:
   identifying one or more entries of a log stream to be rewritten to one or more other locations, said one or more entries owned by a first system of said plurality of systems; and
   rewriting, by a second system of said plurality of systems, said one or more entries owned by the first system to said one or more other locations, wherein said second system is an active system not dedicated to back-up of said first system.

21. An article of manufacture comprising:
   a computer useable medium having computer readable program code means embodied therein for causing the managing of a log stream of a multisystem environment comprising a plurality of systems, the computer readable program code means in said article of manufacture comprising:
   computer readable program code means for causing a computer to effect writing, by a first system of said plurality of systems, one or more entries to a first multisystem log stream, said one or more entries being owned by said first system, said first multisystem log stream adapted to receive at least one additional entry from one or more other systems of said plurality of systems; and
   computer readable program code means for causing a computer to effect rewriting, by a second system of said plurality of systems, at least one entry of said one or more entries owned by said first system to at least one other location, said rewriting removing ownership of said at least one entry by said first system.

22. The article of manufacture of claim 21, wherein said one or more other systems comprises at least said second system.

23. The article of manufacture of claim 21, wherein said one or more other systems is in addition to said second system.

24. The article of manufacture of claim 21, wherein said second system is an active system not dedicated as a back-up system to said first system.

25. The article of manufacture of claim 21, wherein said at least one other location is located at one or more of the following:
   a second multisystem log stream; and
   at a head of said first multisystem log stream.

26. The article of manufacture of claim 21, wherein said computer readable program code means for causing a computer to effect rewriting comprises computer readable program code means for causing a computer to effect said rewriting subsequent to a termination of at least one component of said first system.

27. The article of manufacture of claim 26, wherein said first system comprises one or more resource managers, and said article of manufacture further comprises computer readable program code means for causing a computer to effect indicating that said one or more resource managers is allowed to restart on any one of said plurality of systems.

28. The article of manufacture of claim 27, wherein said computer readable program code means for causing a computer to effect indicating comprises computer readable program code means for causing a computer to effect updating another log stream.

29. The article of manufacture of claim 27, further comprising computer readable program code means for causing a computer to effect restarting one of said one or more resource managers on any one system of said multisystem environment, said restarting being independent of any restarting of said first system.

30. The article of manufacture of claim 21, further comprising:
   computer readable program code means for causing a computer to effect starting a resource manager on any one system of said plurality of systems, said resource manager being included in a group of one or more resource managers associated with an entry set of said at least one entry rewritten to said at least one other location; and
   computer readable program code means for causing a computer to effect writing said entry set back to said first multisystem log stream, wherein said one system owns said entry set.

31. The article of manufacture of claim 30, wherein said at least one other location is on a second multisystem log stream, and further comprising computer readable program code means for causing a computer to effect compressing said second multisystem log stream, subsequent to writing said entry set back to said first multisystem log stream.

32. The article of manufacture of claim 31, further comprising computer readable program code means for causing a computer to effect updating a third multisystem log stream to indicate that any other resource managers of said group are to restart on the same system as said one resource manager.

33. The article of manufacture of claim 30, wherein said entry set comprises any number of the entries of said at least one entry.

34. The article of manufacture of claim 30, further comprising computer readable program code means for causing a computer to effect determining the one or more resource managers to be included in said group.

35. The article of manufacture of claim 34, wherein said computer readable program code means for causing a computer to effect determining comprises:
   computer readable program code means for causing a computer to effect building a matrix of any resource managers associated with said at least one entry; and computer readable program code means for causing a computer to effect performing one or more OR operations between a row of said matrix for said starting resource manager and one or more other rows of said matrix, to obtain said group of one or more resource managers.

36. An article of manufacture comprising:

a computer useable medium having computer readable program code means embodied therein for causing the managing of a log stream of a multisystem environment comprising a plurality of systems, the computer readable program code means in said article of manufacture comprising:

computer readable program code means for causing a computer to effect rewriting one or more entries of a first multisystem log stream to one or more other locations, said one or more entries owned by an inactive first system of said plurality of systems, and said rewriting being performed by a second system of said plurality of systems;

computer readable program code means for causing a computer to effect indicating that said first system does not own said one or more entries; and computer readable program code means for causing a computer to effect indicating that one or more resource managers of said first system is allowed to restart on any of said plurality of systems.

37. The article of manufacture of claim 36, further comprising computer readable program code means for causing a computer to effect taking back ownership of at least one entry of said one or more entries.

38. The article of manufacture of claim 37, wherein said computer readable program code means for causing a computer to effect taking back comprises:

computer readable program code means for causing a computer to effect restarting one resource manager of said one or more resource managers on one system of said plurality of systems, said one resource manager being associated with said at least one entry;

computer readable program code means for causing a computer to effect determining if any other of said one or more resource managers are associated with said at least one entry, wherein a restart group of one or more resource managers associated with said at least one entry is determined;

computer readable program code means for causing a computer to effect writing said at least one entry of said one or more other locations to said first multisystem log stream; and computer readable program code means for causing a computer to effect indicating that any resource managers of the restart group are to restart on the same system as the restarting resource manager.

39. The article of manufacture of claim 38, wherein said one or more other locations is on a second multisystem log stream, and further comprising computer readable program code means for causing a computer to effect compressing said second multisystem log stream, subsequent to said writing of said at least one entry to said first multisystem log stream.

40. An article of manufacture comprising:

a computer useable medium having computer readable program code means embodied therein for causing the managing of a log stream of a multisystem environment comprising a plurality of systems, the computer readable program code means in said article of manufacture comprising:

computer readable program code means for causing a computer to effect identifying one or more entries of a log stream to be rewritten to one or more other locations, said one or more entries owned by a first system of said plurality of systems; and computer readable program code means for causing a computer to effect rewriting, by a second system of said plurality of systems, said one or more entries owned by the first system to said one or more other locations, wherein said second system is an active system not dedicated to back-up of said first system.

* * * * *

UNITED STATES PATENT AND TRADEMARK OFFICE
CERTIFICATE OF CORRECTION

PATENT NO. : 6,076,095
DATED : June 13, 2000
INVENTOR(S) : Clark et al.

It is certified that error appears in the above-identified patent and that said Letters Patent are hereby corrected as shown below:

Col. 1, line 15, delete "08/827,290" and replace with --08/827,292--.

Signed and Sealed this

Twenty-fourth Day of April, 2001

Attest:

NICHOLAS P. GODICI

Attesting Officer    Acting Director of the United States Patent and Trademark Office